United States Patent [19]

Munz

[11] 4,273,213

[45] Jun. 16, 1981

[54] ELEMENT FOR SONIC AND VIBRATORY ABSORPTION

[76] Inventor: Erich Munz, Weststrasse 11, 5204 Lohmar 1, Geber, Fed. Rep. of Germany

[21] Appl. No.: 958,403

[22] Filed: Nov. 7, 1978

[30] Foreign Application Priority Data

Nov. 9, 1977 [DE] Fed. Rep. of Germany ....... 2750122

[51] Int. Cl.³ ................................................ F16F 7/00

[52] U.S. Cl. ...................................... 181/207; 248/633

[58] Field of Search ................................ 181/207-209, 181/285, 286, 288, 284, 291, 292; 248/560, 638, 633, 634; 428/169, 172, 138

[56] References Cited

U.S. PATENT DOCUMENTS

| | | | |
|---|---|---|---|
| 1,628,090 | 5/1927 | Weiss | 428/169 |
| 2,031,950 | 2/1936 | Harshberger | 181/290 |
| 3,026,224 | 3/1962 | Rogers, Jr. | 181/208 |
| 3,436,042 | 4/1969 | Goubergen | 248/633 |
| 3,525,417 | 8/1970 | Giraudeau | 181/208 |
| 3,597,891 | 8/1971 | Martin | 52/145 |
| 3,833,086 | 9/1974 | Giraudeau | 181/207 |
| 4,002,315 | 1/1977 | Goubergen | 248/633 |

FOREIGN PATENT DOCUMENTS

| | | | |
|---|---|---|---|
| 2504165 | 5/1976 | Fed. Rep. of Germany | 248/633 |
| 172796 | 10/1934 | France | 248/633 |
| 619168 | 3/1949 | United Kingdom | 248/633 |

*Primary Examiner*—L. T. Hix
*Assistant Examiner*—Benjamin R. Fuller
*Attorney, Agent, or Firm*—Kurt Kelman

[57] ABSTRACT

The present invention is concerned with an element for the sonic and vibratory absorption, comprising a ledge having ribs of flexible material longitudinally extending along the top and bottom sides, with the top-side ribs over the bottom-side ribs being arranged in staggered relationship. According to the invention, such an element is improved in that provided between respectively two ribs of approximately trapezoidal cross-section is another rib equally of approximately trapezoidal cross-section of an inferior height, which continues to extend through the central area of the element upwardly and downwardly, respectively, in the respective rib of greater height, and that at least on one longitudinal side of the element a stop is provided extending over the entire length of the element.

2 Claims, 4 Drawing Figures

ELEMENT FOR SONIC AND VIBRATORY ABSORPTION

BACKGROUND OF THE INVENTION

The present invention is concerned with an element for sonic and vibratory absorption, comprising a ledge having ribs of flexible material extending along the top and bottom sides, with the top-side and bottom-side ribs being disposed in staggered relationship.

An element for the absorption of vibration is known which is composed of a resilient plate having top and bottom projections. The projections are rectangular in cross-section, with the upper and lower projections being disposed in staggered relationship. The disadvantage of this prior art element resides in that, on account of the cross-sectional configuration of the projections, a progressive load acceptance is not possible and that a rapid decrease of the resilient path occurs if the load limit is exceeded. However, this phenomenon is extremely undesirable because the sound absorption value of the body at the same time considerably decreases thereby. Moreover, it is disadvantageous with the prior art system that on account of its structural built-up the stability over transverse loads is low.

SUMMARY OF THE INVENTION

Basic to the invention is, therefore, the problem of improving an element for the purpose under consideration to the effect that the supporting elements thereof in terms of cross-section and arrangement are so formed that a progressive load acceptance simultaneously with a physical sound absorption can be achieved and a relatively high transverse load is permitted.

To solve this problem the element of the invention is so formed that provided between respectively two ribs of approximately trapezoidal cross-section is a further rib equally of approximately trapezoidal cross-section and of an inferior height, which continues to extend through the central area of the element upwardly and downwardly, respectively into the respective rib of greater height, and that a stop is provided at least at one longitudinal side of the element extending along the entire length of the element.

The fact that the longitudinally extending ribs of different height in cross-section are of a trapezoidal configuration and the arrangement thereof with respect to one another is effected in the manner described above, in case of a progressive load acceptance for each case of an overload a resilient path still sufficient is attained and the desired sound absorption value of the body is thus insured. Moreover, the cross-sectional configuration of the ribs in conjunction with the arrangement of the ribs of greater to smaller height results in an amazingly high transverse load stability.

Advantageous embodiments could reside in that respectively embedded in the areas of connection between two neighboring ribs is a reinforcing layer in the form of a band; that disposed on the support side on the upwardly directed ribs is a rigid support in fixed manner;

that the rigid support is provided with an angular stop ledge extending in parallel to the stop of flexible material;

that the stop ledge of the support at least with an upper rim thereof is embedded in the material of the stop; and that the rigid support is provided with openings and that the flexible material of the upwardly directed ribs in the form of buffers grips over the rigid support.

BRIEF DESCRIPTION OF THE DRAWINGS

For a better understanding of the invention the element is hereinafter explained in more detail with reference to the drawings of exemplary embodiments, wherein FIG. 1 diagrammatically shows a perspective view in cross-section of the element according to the invention.

DESCRIPTION OF THE EMBODIMENTS

Figure 1:
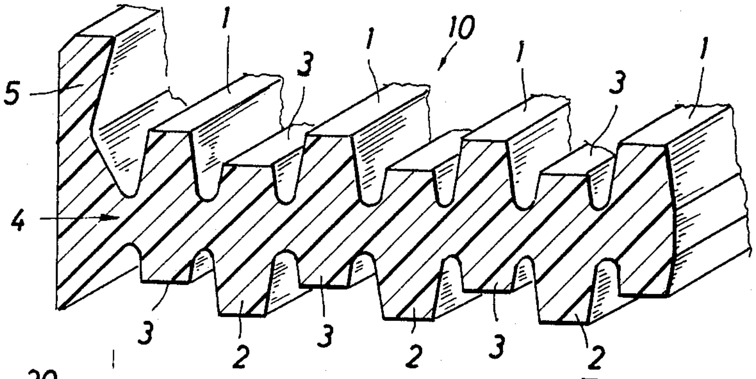

The resilient element according to FIG. 1 is composed of parallel ribs 1 and 2 extending from the central zone 4 upwardly and downwardly, upwardly extending ribs 1 and downwardly extending ribs 2 extending in staggered relationship and with ribs 3 of an inferior height being disposed in the respective spaces between each two ribs 1, 1 and 2, 2. A stop 5 of the same flexible material extends on the longitudinal side along the entire length of the element 10 and 10′ respectively.

Figure 2:
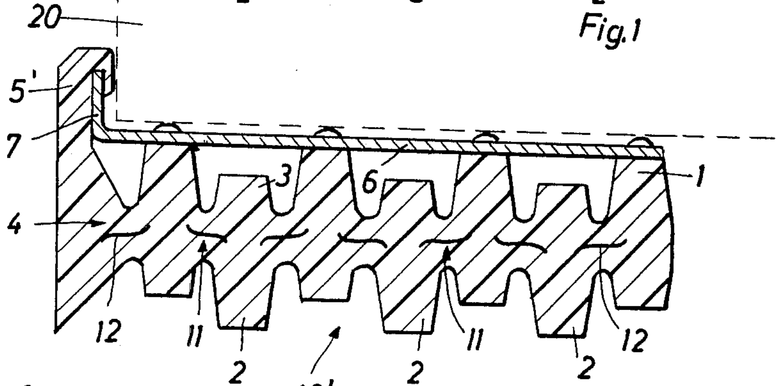
FIG. 2 is a cross-section of the element in a modified of embodiment.
Figure 4:
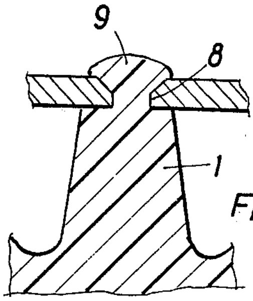
FIG. 4 is a cross-section through a rib of the element along the line IV—IV of FIG. 3.
Figure 3:
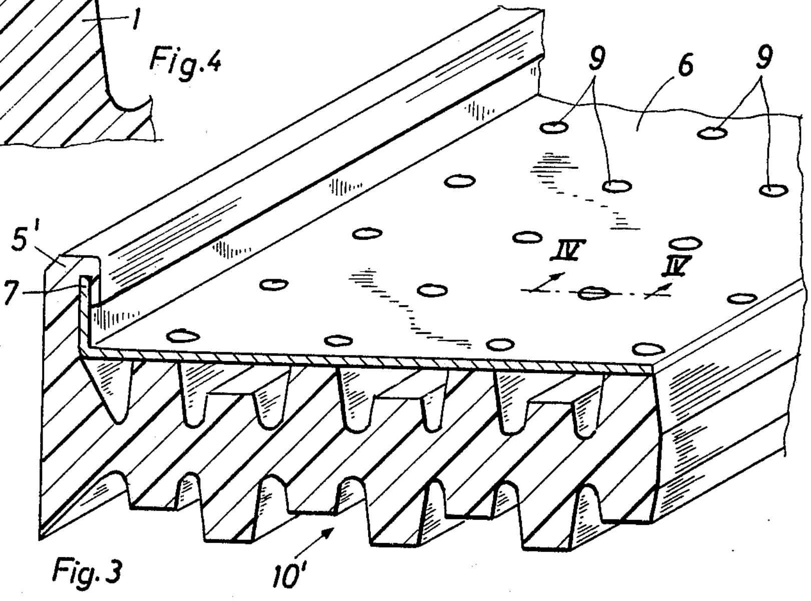
FIG. 3 is a perspective view in cross-section of the element according to FIG. 2.

In the modified embodiment according to FIGS. 2 to 4 element 10′ is provided with a rigid support 6, for example in the form of a sheet which, in the area of the ledge-type stop 5′, can have an angular stop ledge 7 which, however, is not absolutely necessary. According to FIG. 4 support 6 is provided with bores 8 traversed by the flexible material in the form of buffers 9 so that system 20 shown in broken lines in FIG. 2, even if it does not have, for example, rubber feet, can be seated on buffers 9. The rigid support 6 can also be made, for example, of plastic material.

Moreover, it is advatageous to dispose, as shown in FIG. 2, in the central area 4 of the element and in the zone of connection 11 respectively between two neighboring ribs 1 and 2 and 3, respectively, a reinforcing layer in the form of a band 12, for example of a wire fabric, a plastic fabric or the like, through which the critical areas of connection 11 exposed to shearing forces are stabilized.

If no buffers 9 are provided, support 6 may be applied by vulcanization or by means of adhesive, depending on the material of which it is formed.

What is claimed is:

1. An element for sonic and vibratory absorption, comprising a first series of longitudinal ribs of flexible material, the ribs being of substantially uniform height and approximately trapezoidal cross section, the ribs extending substantially equidistantly and parallel to each other over the entire length of the element and projecting from the top side and the bottom side of the element, the top side and bottom side ribs being in staggered relationship and each two ribs defining a space therebetween, and a second series of longitudinal ribs of a height inferior to that of the ribs of the first series and of approximately trapezoidal cross section, each rib of inferior height being arranged in a respective one of said spaces, each rib of inferior height projecting from the top side being in alignment with a respective rib of the first series projecting from the bottom side and each rib of inferior height projecting from the bottom side being in alignment with a respective rib of the first series projecting from the top side, said element further comprising a stop extending over the entire length of the element at least at one longitudinal side of the element and a rigid support fixedly arranged on the ribs of the first series projecting from the top side, said rigid support comprising a stop ledge projecting perpendicularly to the support and parallel to the stop and having an upper rim embedded in the stop and wherein said rigid support has a planar base plate defining an array of openings gripping the ribs of the first series projecting from the top side, said ribs having buffer portions extending above the rigid support and projecting from the openings.

2. The sonic and vibratory absorption element of claim 1, further comprising a reinforcing band embedded in the element in the areas between neighboring ones of the ribs.

* * * * *